A. BREAR.
Device for Raising Water by Steam.
No. 1,553. Reissued Oct. 27, 1863.
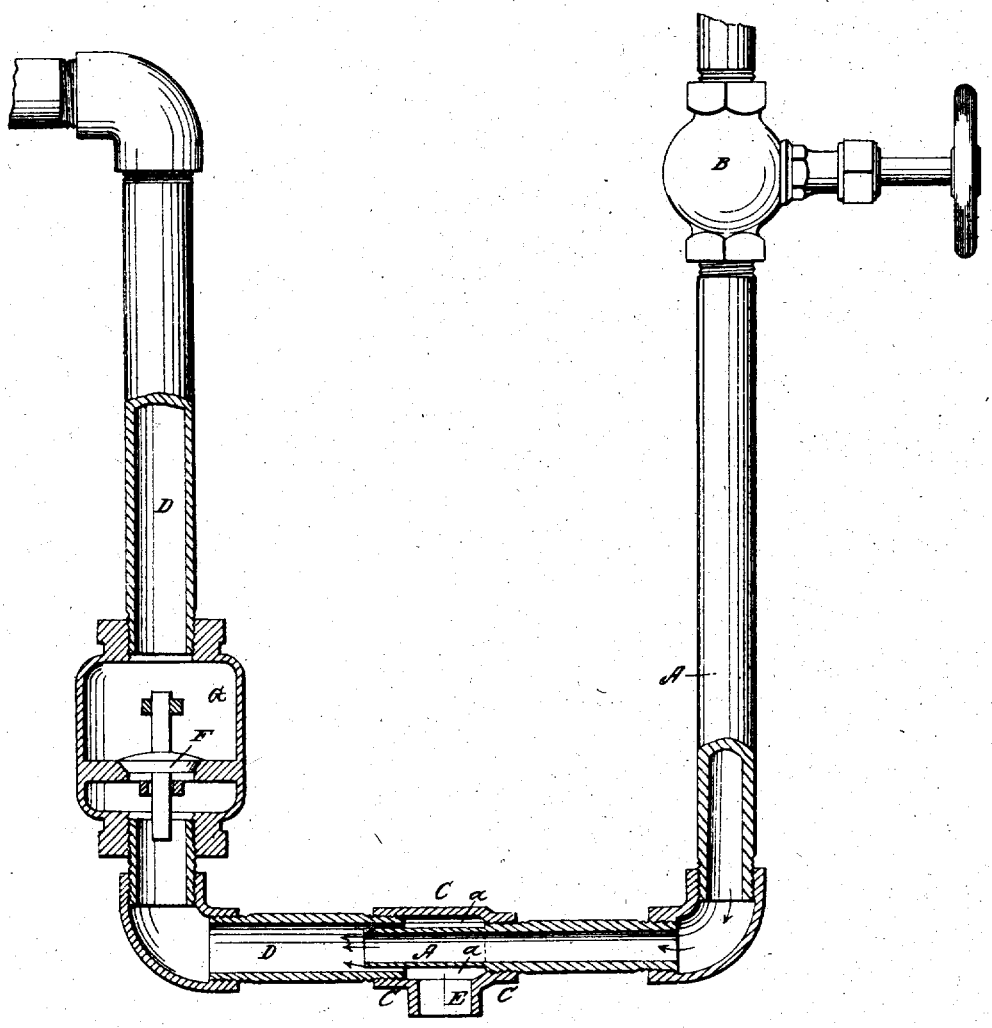
Witnesses:
James Laird
C. N. Hodgson
Inventor.
Abel Brear

UNITED STATES PATENT OFFICE.

ABEL BREAR, OF SAUGATUCK, CONNECTICUT.

IMPROVED DEVICE FOR RAISING AND FORCING WATER BY STEAM.

Specification forming part of Letters Patent No. 34,810, dated April 1, 18[illegible]2; Reissue No. 1,553, dated October 27, 1863.

*To all whom it may concern:*

Be it known that I, ABEL BREAR, of Saugatuck, in the county of Fairfield and State of Connecticut, have invented a new and Improved Apparatus for Raising and Forcing Water and other Liquids; and I do hereby declare that the following is a full, clear, and exact description of the same, reference being had to the accompanying drawing, making a part of this specification, said drawing representing a central vertical section of the apparatus.

Devices similar in some respects to mine have before been used for forcing water against a pressure of steam. For this purpose conical nozzles are employed to contract the volume of steam or air, thus increasing its velocity, but causing it to act on a reduced volume of water. The effect of such previously-existing contrivance is thus to force a small or attenuated body of water against a powerful resistance.

The object of my invention is, on the contrary, to raise or convey a large body of water against a moderate pressure, and for this purpose I have found it necessary to employ an apparatus of essentially different construction, consisting of two concentric cylindrical or parallel sided pipes, through which the fluids pass with less resistance, and by means of which a larger volume of water may be delivered in a given time by an apparatus of given size.

In order that others skilled in the art to which my invention appertains may be enabled to fully understand and use the same, I will proceed to describe the manner of carrying it into effect.

This apparatus consists, principally, of a steam-pipe the mouth of which enters and is surrounded by a socket, in which is an opening for the admission of the water or other liquid to be raised from the well, reservoir, or other source of supply, and from which a delivery-pipe leads to the point where it is to be delivered, the direction of the steam-pipe being the same as that of the contiguous portion of the delivery-pipe. The issuing steam expels the water from the delivery-pipe, and the place of the water so expelled is supplied by water forced up into the socket from the well, reservoir, or other source of supply by pressure of the atmosphere.

A is the steam-pipe, through which steam is admitted from a boiler by opening a stop-valve, B, or cock. C is the socket, of T shape, into one end of which is secured the delivery-pipe D. The end of the steam-pipe enters the delivery-pipe, and the interiors of the latter pipe and of the socket C are larger than the exterior of the end of the steam-pipe, that a space, *a*, may be left around the latter. E is the opening in the socket C for the entrance of the water or other liquid, communicating directly with the space *a*, surrounding the steam-pipe. This opening may have attached to it a vertical pipe to dip into the water or other liquid to be raised without placing the socket itself in the water. The socket C and contiguous portions of the steam-pipe A and delivery-pipe D are arranged horizontally; but at a short distance from the socket C the steam-pipe may have such a direction as is necessary for conveying the steam from the boiler, and the delivery-pipe may have an upward direction, as shown; or its extremity may be turned downward, like the bib of a faucet.

The drawing represents a check-valve, F, in the upright portion of the delivery-pipe at a short distance from the socket C, the said valve being placed in a chamber, G, which is equivalent to an enlargement of the said pipe; but I do not consider this check-valve to be an essential feature of my invention.

To place the apparatus in an operative condition, the socket C and lower portions of the pipes A D may be submerged in the water or other liquid to be raised; but when a pipe is connected with the opening E it will be sufficient to place the lower end of the said pipe in the liquid; but the said pipe should not exceed about twenty-eight feet in height.

To set the apparatus in operation steam is admitted through the pipe A by opening the stop-valve. If the socket C be submerged, the steam begins to act upon the water or other liquid within the delivery-pipe D, and drives it forward, and thereby causes a vacuum to be formed in the lower part of the said pipe and in the space *a a*, and the liquid rushing thereinto through the opening E is driven forward by the steam through the said pipe in a continuous stream. If the socket C is not submerged, the steam issuing from the pipe A into the pipe D produces a draft from the space *a* toward the latter pipe, and an upward draft in the pipe connected with the opening E, and so produces a vacuum in the said space and pipe, which is quickly filled with water, when the operation proceeds in the same manner as though the socket C were submerged. The check-valve, when used, is opened by the water, and kept open while the pressure of the steam is continued, but closes as soon as the steam is shut off, and so retains the liquid in the portion of pipe D above it.

The apparatus may be used with great advantage in raising water from mines, as it will work at any depth or at any distance from the boiler to which steam can be conveyed, and will raise it to any height. It may also be used as a fire-engine, or for discharging the water from sunken ships or other vessels.

Compressed air may be used in place of steam to effect the same purpose, such air being admitted through the pipe A in the same manner as above described.

What I claim as my invention, and desire to secure by Letters Patent, is—

The combination of the steam or air pipe A, terminating in a nozzle of cylindrical or nearly cylindrical form, the open socket C, and delivery-pipe D, substantially as and for the purpose herein specified.

ABEL BREAR.

Witnesses:
J. W. COOMBS,
M. M. LIVINGSTON.